United States Patent [19]

Guevarra et al.

[11] Patent Number: 4,600,440
[45] Date of Patent: Jul. 15, 1986

[54] WATER WASH-UP COATING COMPOSITION

[75] Inventors: Alfredo L. Guevarra, Vallejo; Fredrick J. Connelly, San Leandro, both of Calif.

[73] Assignee: The Flecto Company, Inc., Oakland, Calif.

[21] Appl. No.: 680,427

[22] Filed: Dec. 11, 1984

[51] Int. Cl.$^4$ .......................... C08L 3/00; C08L 91/00
[52] U.S. Cl. ...................................... 106/211; 106/213
[58] Field of Search ................................. 106/211, 213

[56] References Cited

U.S. PATENT DOCUMENTS 2,565,602  8/1951  Fisher et al. ............................ 524/14
2,681,322  6/1954  Aver ...................................... 524/495
2,907,721 10/1959  Aver ...................................... 524/495

OTHER PUBLICATIONS

Surface Active Ethylene Oxide Adducts, Schonfeldt, N., Sep. 13, 1971, Pergamon Press, pp. 227–235.
(Untitled document, includes information on company and twenty-four formulas), Lorama Chemicals Inc.
Arntfield, D. R., Altavilla, V., "New Low-Cost Stains Exhibit Interesting Features", *Journal of Water Borne Coatings*, 1984 Buyer's Guide Issue, pp. 10–13.
"Resins of the 80's", Lorama Chemicals Inc.
"JK 270 A New Oligimer-Resin", Lorama Chemicals Inc.

*Primary Examiner*—Theodore Morris
*Attorney, Agent, or Firm*—Lyon & Lyon

[57] ABSTRACT

Water wash-up paint having a resin binder which is a blend of miscible polysaccharide resin and vegetable oil based resin. Typical is a blend of hydrolyzed starch and alkyd resin. Water wash-up is provided by a blend of hydrophilic and lypophilic surfactants.

18 Claims, No Drawings

WATER WASH-UP COATING COMPOSITION

BACKGROUND OF THE INVENTION

This invention relates to paint type coating compositions. More particularly, it relates to paint made with resinous binder and which is rendered water wash-up by the incorporation of selected surfactants.

Paints utilizing vegetable oil based resin binders have long been well known. For some time polysaccharide resins have been made available for combination with vegetable oil based resins in formulations which contain a relatively high water content. Such formulations have advantages in that they are economical to produce and have good paint qualities. Typical polysaccharide resins for this use are offered by Lorama Chemicals, Inc., Quebec, Canada, under the tradename JK270. Suggested paint formulations with such polysaccharide resins in combination with long, medium and short oil alkyds are described in "New Low-Cost Stains Exhibit Interesting Features", D. R. Arntfield and V. Altavilla, *Journal of Water Borne Coatings*, 1984 Buyer's Guide Issue, pages 10–13. The authors are connected with Lorama Chemicals, Inc. As pointed out in this Lorama Chemicals publication, the products produced are solvent based while containing a substantial water content. Most importantly, the Lorama Chemicals publication points out that its products are not water wash-up. The present invention is an improvement upon the Lorama Chemicals teachings and provides similar products but with an important difference in that the present products are water wash-up.

SUMMARY OF THE INVENTION

In accordance with the present invention a paint formulation is provided which contains a blend of miscible polysaccharide resin and vegetable oil based resin. The paint formulation contains an effective amount of hydrophilic and lyophilic surfactants to render the paint water wash-up. In the preferred embodiment the hydrophilic and lyophilic surfactants together are present in the amount of about 4–12 weight percent, usually about 7–10 weight percent, based upon the resin solids in the formulations. The hydrophilic and lypophilic surfactants are selected to provide a hydrophilic-lypophilic balance (HLB) value in the range of about 8–15, preferably about 9–12. The amount of surfactants and the particular HLB value chosen will depend upon the properties of the particular blend of resins used.

DESCRIPTION OF THE PREFERRED EMBODIMENTS

Resin Component (a) Vegetable Oil Based Resin

While the paint formulation of the invention may utilize either organic solvent based or water reducible versions of vegetable oil based resins, from an economic standpoint the resin will usually be of the organic solvent soluble type. The resin may be used in the pure or neat state, but will typically be commercially available in solution in one or more organic solvents, such as hydrocarbon solvents or glycol ether derivatives based upon ethylene, diethylene, or propylene glycols. Typical solvents include butyl Cellosolve and mineral spirits. Generally the resin may be an alkyd including long oil, medium oil and short oil alkyds. Other suitable choices for the formulation include urethane alkyds of various oil lengths, raw and bodied vegetable oils, emulsified alkyds of various oil lengths and alkyd copolymers.

(b) Polysaccharide Resin

The polysaccharide resin is suitably a hydrolyzed starch that forms a miscible medium with the selected vegetable oil based resin. In general, the hydrolyzed starch will preferably have at least a portion thereof at an average molecular weight of about 20,000–35,000, usually about 24,000–32,000. In the preferred embodiment the hydrolyzed starch has a major portion with a molecular weight of about 28,000 and a minor portion with a molecular weight of less than 10,000. In the preferred embodiment the major portion is present in a weight ratio relative to the minor portion of about 5:1.

(c) Resin Concentrations

The amount of resin solids in the formulation will depend upon the type of paint product being made. The weight ratio of vegetable oil based resin to polysaccharide resin will generally be in the range of about 25:75 to 75:25, with approximately similar amounts by weight of each resin being used in the preferred embodiment.

(d) Resin Solvents

The resins are dispersed in a solvent system which may include organic solvents of the type commonly used with vegetable oil based resins. Typical of the present formulation is the presence of a high water content. Water may be present in an amount of 0–90 percent by volume, preferably about 10–90 percent by volume. In the preferred embodiment water will constitute more than about 50 percent by volume of the formulation.

Surfactants

The key to making the present paint formulation water wash-up is the presence of an effective amount of properly selected surfactants. This requirement is met by utilizing a blend of hydrophilic and lypophilic surfactants which provides the HLB values noted above. The surfactants selected may be ionic or non-ionic and will generally fall in the following categories:
(1) ethoxylated amines and/or amides
(2) ethoxylated alkyl phenols
(3) ethoxylated alcohols
(4) ethoxylated fatty acids
(5) other glycol esters of fatty acids
(6) alkyl sulfonates
(7) polyamino-amides and their acid esters
(8) amino alkyl aryl sulfonates

Optional Components

The present formulations may contain any of the usual additives found in conventional paint formulations designed for a particular purpose. Thus, the present formulations may contain pigments found in conventional coatings. They may also contain defoamers such as those commercially available under the tradenames Nopco NxZgr and NDW, Nalco 2314 or Patcote 577n. The compositions may also contain suitable metallic driers (water dispersible or solvent soluble) in effective amounts and appropriate to the particular resins used and the purpose for which the paint formulation is made.

EXAMPLE

A typical water wash-up formulation of this invention designed for use as a light walnut wood toner/stain is formulated as follows:

| MATERIAL | POUNDS | GALLONS |
|---|---|---|
| (Add in order shown:) | | |
| Butyl Cellosolve | 5.00 | 0.67 |
| Cargill 5542 (alkyd resin) | 58.10 | 6.84 |
| Polysaccharide resin | 83.00 | 8.47 |
| Triton X-15 (lypophilic surfactant) | 2.13 | 0.26 |
| Triton X-405 (hydrophilic surfactant) | 6.87 | 0.75 |
| Ninate 411 (hydrophilic surfactant) | 2.00 | 0.22 |
| Nopco NDW (defoamer) | 3.00 | 0.40 |
| Microtalc CP10-40 (filler) | 10.00 | 0.44 |
| (Disperse to specified hegman grind, then add:) | | |
| Thickener (Rohm & Haas CPE-15) | 12.50 | 1.55 |
| (Premix the following in a separate container before adding:) | | |
| De-ionized water | 41.65 | 5.00 |
| Laponite RDS (thickener) | 2.50 | 0.12 |
| (Mix thoroughly then add:) | | |
| Burnt umber 877-1313 | 18.50 | 1.32 |
| Ferrite yellow 877-1810 | 7.50 | 0.48 |
| Lamp black 877-9907 | 0.50 | 0.05 |
| De-ionized water | 166.60 | 20.00 |
| (Mix thoroughly, then drop to thindown tank; Thindown, add slowly under agitation:) | | |
| 6% Cobalt Intercar (drier) | 0.60 | 0.08 |
| 4% Calcium Intercar (drier) | 1.40 | 0.19 |
| 6% Zirco Intercar (drier) | 0.90 | 0.13 |
| Activ-8 | 0.35 | 0.04 |
| ASA-Skino #1 | 1.50 | 0.20 |
| (Mix thoroughly, then add:) | | |
| De-ionized water | 441.49 | 53.00 |
| (Mix thoroughly for 20 minutes after all materials are in; Mix well before and during filling.) | | |
| | 866.09 | 100.21 |

*(Lorama Chemicals, Inc., JK270 polysaccharide resin: 40% resin solids, 60% equal parts water and propylene glycol.)

What is claimed is:

1. In a paint formulation containing a blend of miscible polysaccharide resin and vegetable oil based resin wherein the weight ratio of polysaccharide resin to vegetable oil based resin ranges from about 25:75 to 75:25, the improvement wherein the paint formulation contains an effective amount of hydrophilic and lypophilic surfactants to render the paint water wash-up.

2. The improved paint formulation in accordance with claim 1, wherein said hydrophilic and lypophilic surfactants together are present in the amount of about 4-12 weight percent based upon resin solids in the formulation.

3. The improved paint formulation in accordance with claim 2, wherein said hydrophilic and lypophilic surfactants together are present in the amount of about 7-10 weight percent based upon resin solids in the formulation.

4. The improved paint formulation in accordance with claim 1, wherein the hydrophilic and lypophilic surfactants provide an HLB value in the range of about 8-15.

5. The improved paint formulation in accordance with claim 4, wherein the hydrophilic and lypophilic surfactants provide an HLB value in the range of about 9-12.

6. The improved paint formulation in accordance with claim 1, wherein the formulation contains organic solvent.

7. The improved paint formulation in accordance with claim 1, wherein the formulation contains 0-90 percent by volume of water.

8. The improved paint formulation in accordance with claim 7, wherein the formulation contains 10-90 percent by volume of water.

9. The improved paint formulation in accordance with claim 6, wherein the organic solvent is selected from butyl Cellosolve and mineral spirits.

10. The improved paint formulation in accordance with claim 1, wherein the vegetable oil based resin is an alkyd.

11. The improved paint formulation in accordance with claim 10, wherein said polysaccharide resin is a hydrolyzed starch having a molecular weight of about 20,000-35,000.

12. A water wash-up paint comprising an organic solvent soluble vegetable oil based alkyd resin, hydrolyzed starch, at least a portion of which has an average molecular weight of 20,000-35,000, the weight ratio of hydrolyzed starch to vegetable oil based alkyd resin ranges from about 25:75 to 75:25, organic solvent, water and a blend of hydrophilic and lypophilic surfactants selected to render said paint water wash-up and having a HLB value of about 8-15 and present in an amount of about 4-12 weight percent based on the resin solids.

13. A water wash-up paint in accordance with claim 12, wherein said portion of hydrolyzed starch has an average molecular weight of 24,000-32,000.

14. A water wash-up paint in accordance with claim 13, wherein said HLB value is about 9-12 and surfactants are present in an amount of about 7-10 weight percent of said resin solids.

15. A water wash-up paint in accordance with claim 14, wherein the alkyd resin and hydrolyzed starch are present in similar amounts by weight.

16. A water wash-up paint in accordance with claim 15, wherein said hydrolyzed starch has a major portion having an average molecular weight of about 28,000 and a minor portion having an average molecular weight below 10,000.

17. A water wash-up paint in accordance with claim 16, wherein said major and minor portions of hydrolyzed starch are present in a weight ratio of about 5 to 1.

18. A water wash-up paint in accordance with claim 17, wherein said paint contains more than about 50% by volume of water.

* * * * *